Aug. 19, 1958    E. O. P. TATTER    2,847,862
MULTISPEED FRICTION DRIVE MECHANISM
Filed Oct. 15, 1956    2 Sheets-Sheet 2
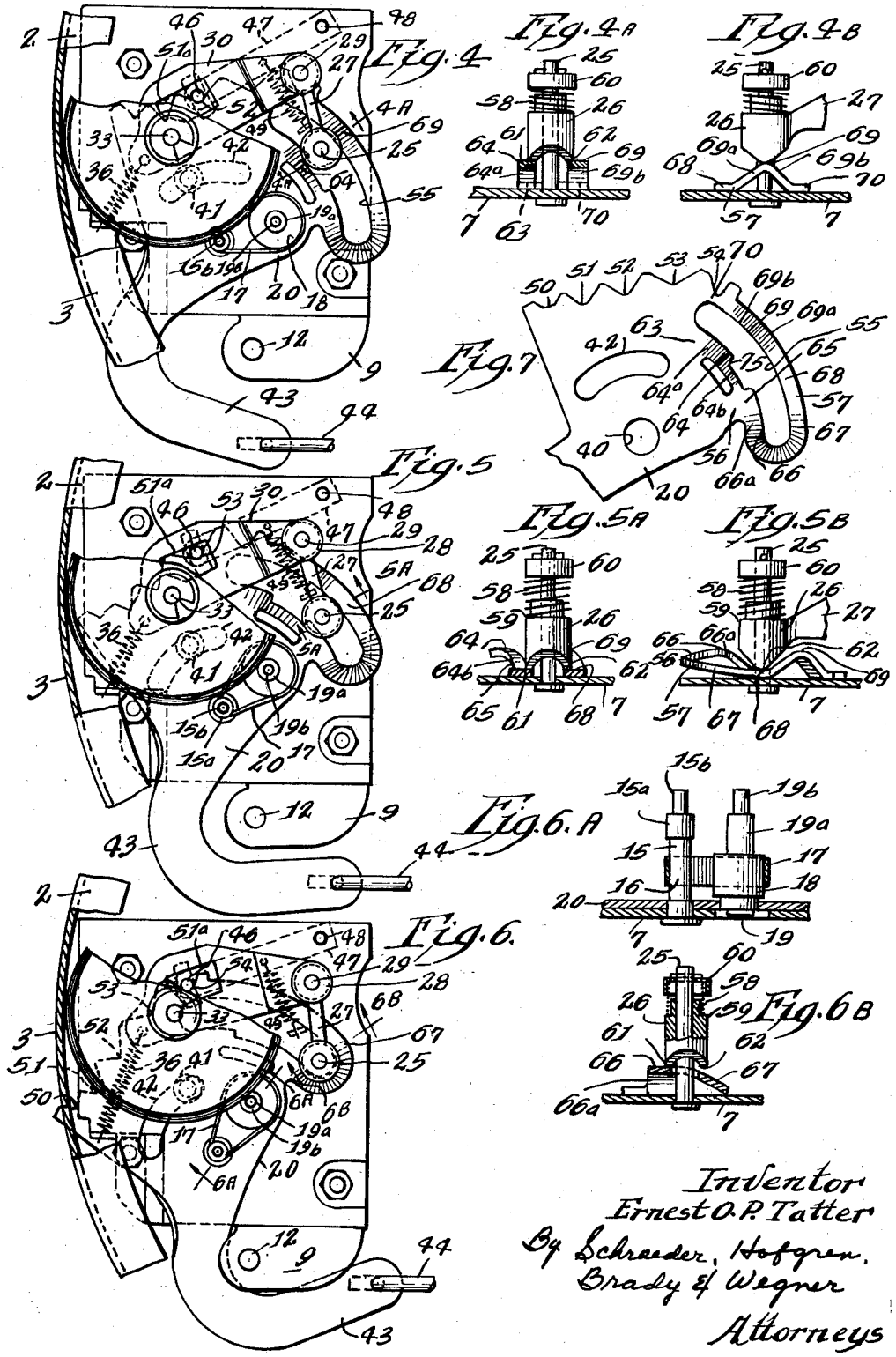
Inventor
Ernest O. P. Tatter
By Schroeder, Hofgren,
Brady & Wegner
Attorneys

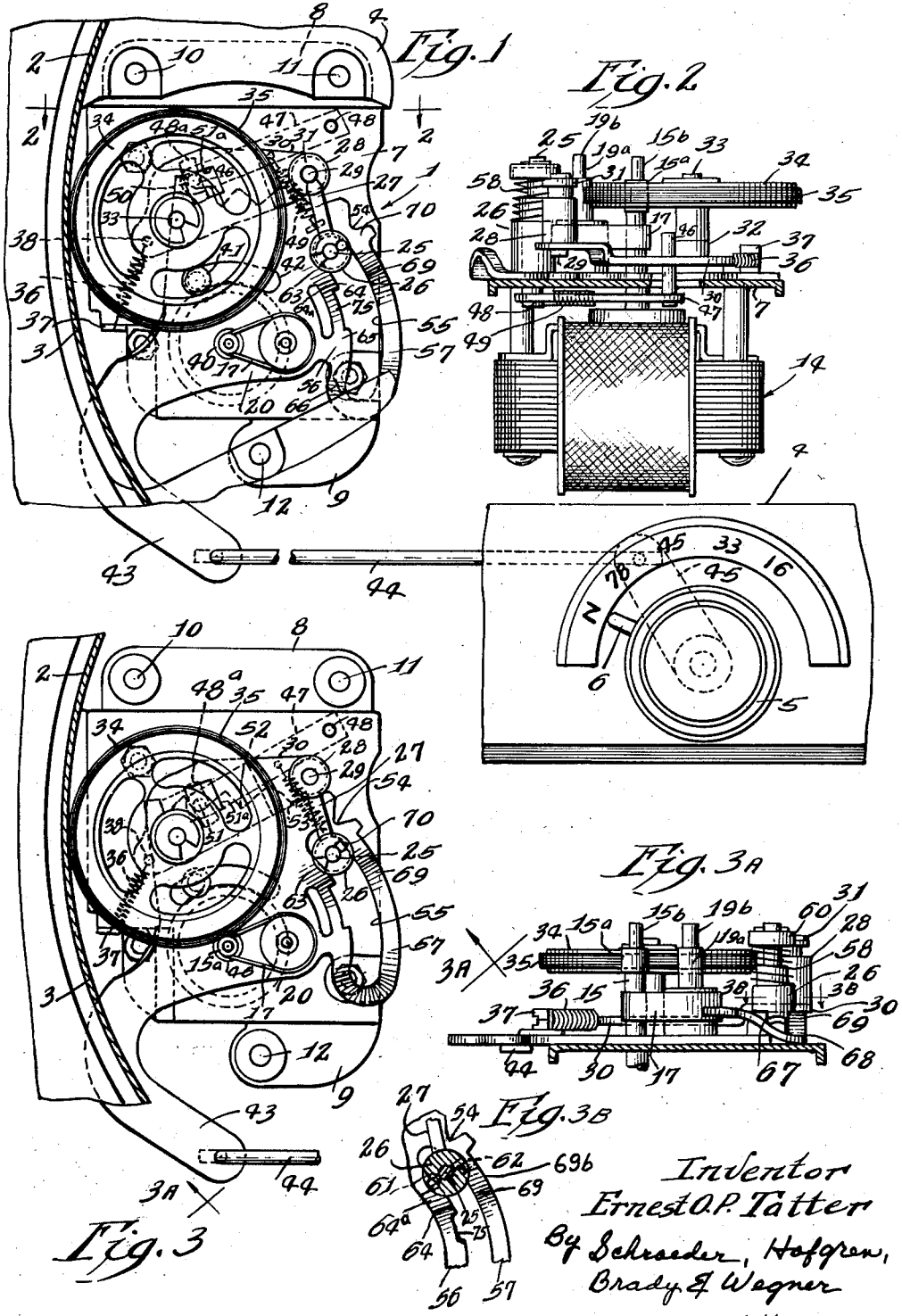

United States Patent Office 2,847,862
Patented Aug. 19, 1958

2,847,862

MULTISPEED FRICTION DRIVE MECHANISM

Ernest O. P. Tatter, Bensenville, Ill., assignor, by mesne assignments, to Warwick Manufacturing Corporation, Chicago, Ill., a corporation of Delaware Application October 15, 1956, Serial No. 616,024

9 Claims. (Cl. 74—199)

This application relates to multispeed friction drive mechanism and more particularly to such a drive mechanism for a phonograph turntable.

In the past, plural speed friction drive mechanisms in which an idler wheel is axially shifted between drive pulley sections of different diameter have required a rather difficult operation of a manual control knob between certain speed settings because of the necessity for causing a cam follower to travel up an inclined cam while at the same time the idler wheel is forced into tight engagement with a turntable rim which resists the axial shift of the wheel.

An object of this invention is to provide a new and improved multispeed friction drive mechanism which may be manually adjusted with minimum effort.

Another object of the invention is to provide a multispeed friction drive mechanism for a turntable having a depending peripheral rim in which an idler wheel adapted for engagement with the rim is mounted for axial movement so as to be engageable with the plurality of driven pulley sections for transmitting a drive from one of said sections to the turntable and is mounted for lateral movement to permit movement of the idler wheel from the turntable rim and cam means mounted for oscillatory movement and having alternate high and low portions for placing said idler wheel in either an upper or lower position, respectively, and means effective to move the idler wheel from the rim whenever the idler wheel is traveling from a lower position to a higher position in either direction of movement of said cam means.

A further object of the invention is to provide a plural speed friction drive mechanism for a turntable including two pulley sections of different diameter and an idler wheel adapted to be engageable with one of said pulley sections and a rim of the turntable, means for supporting the idler wheel including a vertically extending fixed post, a bushing slidably mounted on the post, an arm extending from the bushing, and a plate supporting the idler wheel mounted for pivotable movement about said arm, a control lever mounted for oscillatory movement and having first and second cam sections at opposite sides of the post, a pair of cam followers on the bushing associated one with each of the cam sections, said first cam having low portions establishing first and third speed positions with the idler wheel at a first level and high portions establishing second and fourth speed positions with the idler wheel at an upper level, whereby the relative movement of the first cam section and associated cam follower from first to second and third to fourth positions raises the cam follower and exerts a turning force on the bushing in a direction to shift the idler wheel from the rim, the second cam section having a high portion at the second speed position and effective when the lever is moved from third to second speed position to engage and raise its associated cam follower and exert a turning force on the bushing to pull the idler wheel from the rim, and means defining a cutout in the first cam section in the high portion thereof between second and third speed positions to prevent engagement in said area with the associated follower.

Another object of the invention is to provide a friction drive, as defined in the preceding paragraph, wherein the control lever has a detent section operable with a movable detent to maintain the control lever in a selected speed position, and wherein the detent section has a neutral position at an end thereof wherein the detent is positioned to hold the idler wheel away from said drive shafts.

The objects of the invention generally set forth together with other ancilliary advantages are attained by the construction and arrangement shown by way of illustration in the accompanying drawings, in which:

Fig. 1 is a fragmentary plan view of a phonograph and particularly the multispeed friction drive mechanism and showing the manually operable mechanism for adjusting the drive mechanism with all the mechanism shown in a neutral drive position;

Fig. 2 is a vertical section taken generally along the line 2—2 in Fig. 1;

Fig. 3 is a fragmentary plan view of the mechanism shown in Fig. 1 with the parts positioned in a first speed position;

Fig. 3A is a vertical elevation taken generally along the line 3A in Fig. 3 with the motor not shown;

Fig. 3B is a fragmentary horizontal section taken generally along the line 3B of Fig. 3A;

Fig. 4 is a fragmentary plan view of the drive mechanism shown in a second speed position;

Fig. 4A is a fragmentary section in elevation taken generally along the line 4A—4A in Fig. 4;

Fig. 4B is a right hand side elevation of the mechanism shown in Fig. 4A;

Fig. 5 is a fragmentary plan view of the drive mechanism shown in a third speed position;

Fig. 5A is a fragmentary section in elevation taken along the line 5A—5A of Fig. 5;

Fig. 5B is a right hand side elevation of the mechanism shown in Fig. 5A;

Fig. 6 is a fragmentary plan view of the drive mechanism with the turntable shown broken away and with the parts in a fourth speed position;

Fig. 6A is a fragmentary section in elevation taken along the line 6A—6A in Fig. 6;

Fig. 6B is a fragmentary section in elevation taken along the line 6B—6B in Fig. 6; and Fig. 7 is a fragmentary plan view of the control lever.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

As shown in Fig. 1, the multispeed friction drive mechanism, indicated generally at 1, is associated with a turntable 2 having a downwardly depending, peripheral rim 3. A phonograph motor board 4 may carry a knob 5 provided with an indicator 6 for indicating the speed setting of the drive mechanism. The drive mechanism includes a plate 7 provided with flanges 8 and 9 which may receive suitable fasteners extended through openings therein and in the motor board for mounting the drive mechanism to the motor board. These fasteners may be in the form of pins, as indicated at 10, 11, and 12.

The mounting plate 7 supports a drive motor 14 which drives a drive shaft 15 which is rotatably mounted in the plate 7. The drive shaft 15 has pulley sections 15a and 15b arranged at different levels and forming a pulley on the drive shaft 15. The pulley sections 15a and 15b are of different diameters so as to provide different speeds of the turntable in the manner more fully described hereinafter.

The drive shaft 15 has a drive pulley 16 (Fig. 6A) around which a belt 17 passes and the belt also passes around a pulley 18 on a second drive shaft 19 which is rotatably mounted on a control lever 20. The second drive shaft 19 has another pulley composed of pulley sections 19a and 19b at different levels which are of different diameters from each other and from the pulley sections 15a and 15b on the drive shaft 15.

A vertical pivot post 25 extends upwardly from the plate 7 and is fixed thereon and rotatably and slidably carries a bushing 26 having an arm 27 formed at its end with a sleeve 28. The sleeve 28 rotatably receives a pin 29 which is fixed to an idler wheel mounting plate 30. The pin 29 is held against axial movement within the sleeve 28 by a clip fastener 31. A means for supporting an idler wheel comprises the pivot post 25, the bushing 26, the arm 27, and the mounting plate 30 which carries a bearing 32 and a pin 33 on which an idler wheel 34 is rotatably mounted and confined against axial movement relative thereto. The idler wheel 34 may be provided with a tire 35 of a suitable rubber-like material. The idler wheel 34 is normally maintained in engagement with the rim 3 of the phonograph turntable by a spring 36 connected between an ear 37 on the plate 7 and a connection 38 on an end of the mounting plate 30.

The control lever 20 is positioned immediately above the mounting plate 7 and has an opening 40 surrounding the drive shaft 15, about which the lever pivots, and the lever is confined in its movement by a headed pin 41 secured to the mounting plate 7 and slidable in an arcuate slot 42 in the control lever. An arm 43 of the control lever 20 is connected by a link 44 to an arm 45 associated with the manual knob 5. Rotation of the knob 5 to a position as indicated by the indicator 6 relative to speed setting indicia provided on the motor board will result in a corresponding positioning of the control lever 20.

The control lever 20 is maintained in its selected speed position by a detent pin 46 carried on an arm 47 beneath the mounting plate 7 and pivotally mounted on said plate by a pin 48. The detent pin 46 extends up through a slot 48a in the plate 7. The detent arm is urged by a spring 49 in a direction to cause the detent pin 46 to engage one of a plurality of notches in a detent section of the control lever 20. At one limit of movement of the control lever 20, a notch 50 in the detent section engages the detent pin 46 so as to hold the control lever in a neutral, no-drive position, as shown in Fig. 1. In this position of the parts, the detent pin 46, which extends upwardly through an opening 51a in the idler wheel mounting plate 30, engages the edge of the opening to swing the idler wheel to the position shown in Fig. 1 where it is out of engagement with the pulley sections on drive shafts 15 and 19. A plurality of successive notches 51, 52, 53 and 54 cooperate with the detent pin 46 to hold the control lever 20 in first, second, third and fourth speed positions, respectively.

The control lever 20 is provided with an arcuate slot 55 through which the fixed post 25 extends and a first arcuately extending cam section 56 is formed at one side of said slot and a second arcuately extending cam section 57 is formed at the other side of the slot 55.

The bushing 26, previously referred to, which has the arm 27, is slidably mounted for vertical movement on the post between the positions shown in Figs. 4A and 5A and is normally urged downwardly on the post by a spring 58 confined between a shoulder 59 on the bushing and a cap 60 secured to the upper end of the post 25. The bushing 26 is formed at its lower end with a pair of downwardly tapered cam followers 61 and 62 which, as shown in Fig. 3B, extend along a line which is at an angle to the arm 27 extended from the bushing.

The first arcuately extending cam section 56 (Fig. 7) on the control lever 20 is formed with alternate high portions and low portions so that, in cooperation with the cam follower 61 on the bushing 26, the elevation of the idler wheel 34 relative to the drive shafts 15 and 19 is determined. The cam section 56 has a low portion 63 and a succeeding high portion 64 with a connecting section 64a inclined upwardly from the low portion 63. A second low portion 65 is on the other side of high portion 64 with an inclined section 64b therebetween. A final high portion 66 is connected to the low portion 65 by an inclined section 66a. The second cam section 57 has a section 67 opposite the high portion 66 of cam 56 which is at a lower level and does not engage the associated cam follower 62 on the bushing 26. A next portion 68 of the cam section 57 is at the same level as the low portion 65 of cam section 56 and may engage the cam follower 62 when the control lever 20 is in third speed position. The cam section 57 has a high portion 69 with an upwardly inclined connecting section 69a from the low portion 68 of the cam section. The high portions 64 and 69 of cam sections 56 and 57, respectively, are on a line which is substantially radial to the first drive shaft 15. An inclined section 69b connects high portion 69 with a low portion 70 of cam section 57 opposite from the low portion 63 of cam 56.

The neutral position of the drive mechanism and various speed positions thereof is illustrated in the several figures of the drawings. In Fig. 1, with the drive mechanism set in a no-drive position, the detent pin 46 has been forced outwardly by the detent notch 50; and the detent pin by its engagement with the edge of the opening 51a in the idler wheel mounting plate 30 has shifted the idler wheel 34 away from engagement with either of drive shafts 15 and 19. The cam followers 61 and 62 both rest on low portions 63 and 70, respectively, of the cam sections 56 and 57.

In Fig. 3, the drive mechanism has been set at a first speed position which may be a position to provide a 78 R. P. M. speed for the turntable 2. As shown in Figs. 3, 3A, 3B, the control lever 20 has been moved counter-clockwise and is held in position by the detent pin 46 engaging in detent notch 51. The idler wheel 34 is at a level to engage the pulley section 15a on the drive shaft 15. This level of the idler wheel is attained by the cam followers 61 and 62 on the bushing 26 still both being engaged on their respective low portions 63 and 70 of the cam sections.

In a second speed position of the drive mechanism (Figs. 4, 4A, 4B), which may be one to provide a 45 R. P. M. speed of the phonograph turntable 2, the detent pin 46 is in engagement with a detent notch 52 to hold the control lever 20 in position resulting from further counterclockwise movement. The idler wheel 34 is now at an upper level and as a result engages the smaller pulley section 15b on the drive shaft 15. This level of the idler wheel 34 results from the cam followers 61 and 62 resting on the high portions 64 and 69 of the cam sections 56 and 57, as shown in Figs. 4A and 4B, with both cam followers extending equal distances from the center line of pivot shaft 25. This places the bushing 26 at a higher level on the post 25 and results in elevating the arm 27 which carries the idler wheel mounting plate 30 with the result that the idler wheel 34 is positioned at an upper level.

A third selected speed position of the drive mechanism is shown in Figs. 5, 5A, 5B, wherein the detent pin 46 is in engagement with a notch 53 in the detent section of the control lever 20 to hold the lever in selected position. This may be one to provide a 33 R. P. M. speed of the turntable 2. In this position of the mechanism, the drive shaft 19 has been carried toward the idler wheel 34 by the pivotal action of the control lever 20 about the drive shaft 15 and engages with the idler wheel. The idler wheel is at its lower level so as to engage the larger diameter pulley section 19a on the drive shaft 19. This level of the idler wheel 34 is attained by the cam followers 61 and 62 on the bushing 26 being in engagement with the low portions 65 and 68 on their respective cam sections 56 and 57.

A fourth speed position of the drive mechanism is illustrated in Figs. 6 and 6B which may be one to drive the phonograph turntable 2 at a fourth speed, such as a 16 R. P. M. speed. In this speed position, the idler wheel 34 is at its upper level and is in engagement with the smaller diameter pulley section 19b of the drive shaft 19. The control lever 20 is held in its adjusted position by engagement of the detent pin 46 in a detent notch 54 of the detent section of the lever. This level of the idler wheel is attained by the cam follower 61 on the bushing 26 being in engagement with the high portion 66 of the cam section 56.

It will be seen from the foregoing description that as the control lever 20 is moved in a counterclockwise direction, as viewed in the drawings, the bushing 26 is elevated onto a high portion 64 or 66 of the cam section 56 when moving from a first to second speed position or a third to fourth speed position, respectively. These speed position changes require the application of sufficient force at the manual control knob 5 to raise the bushing 26 on the post 25 against the action of the spring 58 as the cam follower 61 engages inclined section 64a or 66a of cam 56. The movement of the control knob 5 is facilitated in these operations by the exerting of a turning force on the bushing 26 to withdraw the idler wheel 34 from engagement with the rim 3 of the turntable when axially moving the idler wheel from first to second and third to fourth speed positions so as to prevent sliding of the idler wheel against the rim 3. This is accomplished by engagement between the inclined sections 64a or 66a of the cam 56 with the cam follower 61 as the control lever 20 moves in a counterclockwise direction. This turning force as the cam follower 61 travels from first to second speed position onto the high portion 64 is not counteracted by the high portion 69 on the cam section 57 since it will be noted, as shown in Figs. 3 and 3B which illustrate a positioning of the parts before commencing to travel on the inclined section 64a of cam 56, the cam follower 61 is positioned immediately adjacent the beginning of the inclined section 64a while the cam follower 62 is spaced a much greater distance from the inclined section 69b of cam section 57.

When the control lever 20 is moved in a clockwise direction, as viewed in the drawings, the bushing 26 moves downwardly on the post 25 when moving from fourth to third and from second to first speed positions by traveling down the inclined sections 66a and 64a of cam section 56. Also, from second to first speed position, the follower 62 travels down inclined section 69b of cam 57. As the control lever 20 moves from third to second speed position, it is necessary that the bushing 26 slide upwardly on the fixed post 25 to place the idler wheel 34 at an upper level to engage the smaller diameter pulley section 15b of the drive shaft 15. Since it is desirable to maintain at a minimum the force required at the manual control knob 5, the inclined section 69a on the cam section 57 is provided so that it will engage the cam follower 62 and exert a turning force on the bushing 26 in a clockwise direction to pull the idler wheel 34 from the turntable rim 3 so as to prevent any sliding action between the idler wheel and the rim as the idler wheel changes its position of elevation. This action of the inclined section 69a of cam 57 on the bushing 26 is facilitated by recessing or cutting out, as indicated at 75 of the inclined section 64b of cam 56 so as to prevent engagement thereof with the cam follower 61 as the control lever 20 is moved from third to second speed position.

It will be seen from the foregoing that the control lever 20, the cam sections 56 and 57, and the cam followers 61 and 62 constitute means for axially shifting and laterally moving the idler wheel 34.

The principles of this invention may be equally well applied to a control lever in which the cam sections have high and low portions formed from edges of flanges turned up from the control lever.

I claim:

1. A multispeed friction drive mechanism for a turntable comprising, in combination, a pair of drive shafts each having a pulley with two pulley sections of different diameter, an idler wheel adapted to be engageable with a rim of the turntable and one of said pulley sections for driving the turntable, means mounting the idler wheel for axial and lateral movement including a vertically extending fixed post, a bushing rotatably and slidably mounted on the post and having at its lower end a pair of laterally spaced cam followers on opposite sides of the post, an arm extending from the bushing at an angle to a line extending between the cam followers and an idler wheel mounting plate pivoted on said arm, a spring urging said plate and idler wheel toward the turntable rim, a control lever mounted for pivotal movement and having first and second cam sections at opposite sides of the post, a movable detent and a detent section on the control lever for holding the control lever in selected position, said first cam having low portions establishing first and third speed positions with the idler wheel at a first level and high portions establishing second and fourth speed positions with the idler wheel at a higher level and connecting inclined sections between said high and low cam portions whereby the relative movement of the first cam and a cam follower on the bushing from first to second and third to fourth positions requires raising the cam follower on a connecting inclined section and exerts a pivoting action on the bushing to turn the arm and shift the idler wheel from the rim against the action of the spring, the second cam section having a high portion at the second speed position and a low portion at the third speed position with a connecting inclined section and effective when the lever is moved from third to second speed position to engage the other follower and raise the pivoted bushing and exert a pivoting action on the bushing to turn the arm and pull the idler wheel from the rim against the action of the spring, means defining a cutout in the first cam inclined section between second and third speed positions to prevent engagement of said first cam with the associated follower, and manually operated selector means connected to said control lever for placing said lever in a selected speed position.

2. A drive mechanism as defined in claim 1 in which the detent section has a plurality of spaced notches for selective engagement with the movable detent including an end notch engageable with the movable detent to shift the movable detent against the idler wheel mounting plate and move the idler wheel from the drive shafts to a no-drive position.

3. A friction drive mechanism for driving a turntable at one of several manually selectable speeds comprising, in combination, a mounting plate, an idler wheel adapted to be engageable with a rim of the turntable, drive means having pulley sections of different diameters at different levels, a control lever pivotally mounted on said mounting plate, a vertically extending fixed post on said plate and extending up through an elongated arcuate slot in said lever, a first elongated cam section on the lever at one side of the post, a second elongated cam section at the other side of the post, a member slidably mounted on the post and having a pair of laterally spaced cam followers at its lower end associated one with each of the cams, an arm extending from the member at an angle to a line extending between the cam followers, an idler wheel mounting plate pivoted on said arm, means urging said idler wheel toward the turntable rim, said first cam section having low portions establishing first and third speed positions with the idler wheel at a first level and a high portion establishing a second speed position with the idler wheel at a higher level and connecting inclined sections between the high and low cam portions, the relative movement between the first cam section and associated follower from first to second speed position raising the cam follower and exerting a pivoting action on the member in a direction to shift the idler wheel from the rim, the second cam section having a high portion at the second speed position and a low portion at the third speed position of the control lever with a connecting inclined section and effective when the lever is moved from third to second speed position to engage the other follower to raise the member and exert a pivoting action thereon in a direction to pull the idler wheel from the rim, and means defining a cutout in the connecting inclined section of the first cam section between second and third speed positions to prevent engagement of said first cam section with the associated follower.

4. A multispeed friction drive mechanism for a turntable comprising, in combination, a pair of drive shafts each having a pulley with two pulley sections of different diameter, an idler wheel adapted to be engageable with a rim of the turntable and one of said pulley sections for rotating the turntable, a control lever pivotable about one drive shaft and movably carrying the other drive shaft, a vertically extending fixed post extending up through an elongated arcuate slot in siad lever, a first arcuately extending cam section on the lever at one side of the post, means mounting the idler wheel for axial and lateral movement relative to the fixed post including a bushing rotatably and slidably mounted on the post and having a pair of laterally spaced cam followers one of which is associated with said cam section, an arm extending from the bushing and an idler wheel mounting plate pivoted on said arm, said first cam section having low portions establishing first and third speed positions with the idler wheel at a first level and high portions establishing second and fourth speed positions with the idler wheel at a higher level and connecting inclined sections between said high and low cam portions whereby the relative movement of the first cam and follower from first to second and third to fourth positions requires raising the cam follower on a connecting inclined section and exerts a pivoting action on the bushing to turn the arm and shift the idler wheel from the rim against the action of the spring, and cam means associated with the other of said cam followers and effective when the lever is moved from third to second speed position to engage said other follower and turn and raise the pivoted bushing to pull the idler wheel from the rim against the action of the spring, and means defining a cutout in the first cam between second and third speed positions to prevent engagement of said first cam with the associated follower.

5. A multispeed friction drive mechanism for a turntable having a depending peripheral rim comprising, a pair of drive shafts each having a pulley with at least one pulley having pulley sections of different diameter, an idler wheel disposed between the drive shafts and the rim for driving the turntable, means including a movable member mounting the idler wheel for axial movement to position the idler wheel at a desired level relative to said pulleys and for lateral movement to permit movement of the idler wheel from the turntable rim, cam means engageable with the member and movable relative thereto and having alternate high and low portions with connecting inclined sections for placing said member and the idler wheel in either an upper or lower position, respectively, with respect to the drive shafts and a control lever mounting the cam means for back and forth movement relative to said member, said cam means being arranged on opposite sides of said member to exert a turning force on the member to move the idler wheel from the rim whenever said member is moving on an inclined section of the cam from a low area to a high area of the cam means in either direction of movement of said cam means.

6. A drive mechanism for driving a turntable having a depending peripheral rim at one of several manually selectable speeds comprising, a pair of drive shafts each having a pulley with pulley sections of different diameter, an idler wheel disposed between the drive shafts and the rim, means including a movable member mounting the idler wheel for axial movement to position the idler wheel at the level of one of said pulley sections and for lateral movement to permit movement of the idler wheel from the turntable rim and also to position the idler wheel in engagement with one or the other of said drive shafts, cam means engageable with the member and movable relative thereto and having alternate high and low areas for placing said member and the idler wheel in either an upper or lower position, respectively, with respect to the drive shafts, means mounting the cam means for movement in either direction relative to said member, said cam means being positioned relative to said member to exert a turning force on the member to move the idler wheel from the rim whenever said member is moving from a low area to a high area of the cam means in either direction of movement of said cam means, and manually operable means for moving said cam means in either direction.

7. In a multispeed drive mechanism for a phonograph turntable, drive means having pulley sections of different diameters at different levels, a wheel adapted to engage the turntable and one of said pulley sections, means for supporting the wheel comprising, a vertical pivot post, a bushing pivotally and slidably supported on said post and having an arm extending therefrom and a plate pivoted to the end of said arm and carrying a shaft for said wheel, and means for shifting said wheel comprising, a lever pivoted on a vertical axis and provided with a cam movable along one side of said post and a cam movable along the opposite side of the post, a cam follower portion on said bushing operable by the cam on one side of the post to raise and lower the bushing and to swing it in a predetermined direction, and a cam follower on said bushing operable by the other cam to raise and lower and swing the bushing in the same direction.

8. In a multispeed drive mechanism for a phonograph turntable having a pair of drive shafts each having a pulley with two pulley sections of different diameter, a wheel adapted to engage the turntable and one of said pulley sections, means for supporting the wheel comprising, a vertical pivot post, a bushing pivotally and slidably supported on said post and having an arm extending therefrom and a plate pivoted to the end of said arm and carrying a shaft for said wheel, and means for shifting said wheel comprising, a control lever pivoted on a vertical axis and provided with a first means operable in one direction of movement of the control lever to change the elevation of the idler wheel and simultaneously swing the idler wheel out of engagement with the turntable and means operable in the opposite direction of movement of the control lever to change the elevation of the idler wheel and swing the idler in the same direction.

9. In a multispeed drive mechanism for a phonograph turntable having drive shafts each having a pulley with two pulley sections of different diameter and a wheel adapted to be engaged selectively with the turntable and any one of said pulley sections, means for supporting said wheel comprising a pivot post, a bushing pivotally and slidably supported on said post and having an arm extending therefrom and means pivoted to the end of said arm and carrying a shaft for said wheel, and means for selectively engaging said wheel with said turntable and one of said pulley sections comprising a movable lever having a plurality of operative positions and carrying a first means operable when the lever is moved in one direction to shift the idler wheel axially and simultaneously to swing the idler wheel out of engagement with the turntable during the axial shift, and means operable during a reverse movement of the lever to shift the idler wheel axially and to swing the idler wheel out of engagement with the turntable during the axial shift.

References Cited in the file of this patent

UNITED STATES PATENTS

| | | |
|---|---|---|
| 2,438,265 | Metzner | Mar. 23, 1948 |
| 2,584,580 | Hardy | Feb. 5, 1952 |
| 2,612,053 | Capell | Sept. 30, 1952 |
| 2,746,306 | Hartman | May 22, 1956 |